(12) United States Patent
Entenmann

(10) Patent No.: US 6,186,587 B1
(45) Date of Patent: Feb. 13, 2001

(54) BLIND ARRANGEMENT FOR VEHICLES

(75) Inventor: Karin Entenmann, Planegg (DE)

(73) Assignee: Webasto Karosseriesysteme GmbH, Stockdorf (DE)

( * ) Notice: Under 35 U.S.C. 154(b), the term of this patent shall be extended for 0 days.

(21) Appl. No.: 09/452,388

(22) Filed: Dec. 1, 1999

(30) Foreign Application Priority Data

Dec. 1, 1998 (DE) ............................................. 198 55 354

(51) Int. Cl.$^7$ ....................................................... B60J 7/00
(52) U.S. Cl. .................. 296/214; 160/267.1; 160/370.22
(58) Field of Search ................ 296/214; 160/265–273.1, 160/264, 370.22

(56) References Cited

U.S. PATENT DOCUMENTS

| | | | |
|---|---|---|---|
| 1,791,548 | * 2/1931 | Zucca | 160/273.1 X |
| 2,594,910 | * 4/1952 | Germann | 296/98 |
| 4,792,178 | * 12/1988 | Kokx | 296/98 |
| 4,867,220 | * 9/1989 | Matsumoto et al. | 296/219 X |

FOREIGN PATENT DOCUMENTS

| | | | |
|---|---|---|---|
| 1102581 | * 1/1950 | (DE) | 296/214 |
| 955218 | * 1/1950 | (FR) | 296/98 |
| 63-258213 | 10/1988 | (JP) . | |
| WO 96/01190 | 1/1996 | (WO) . | |

* cited by examiner

Primary Examiner—Dennis H. Pedder
(74) Attorney, Agent, or Firm—Nixon Peabody LLP; David S. Safran

(57) ABSTRACT

In a blind arrangement with a blind web (10) which can be unwound from a winding roller (12), in order to at least partially cover an opening in a roof relative to the interior of a vehicle, especially a motor vehicle, and which can be wound onto the winding roller (12) for at least partially covering and exposing the roof opening, the blind web (10) is provided with transversely extending arches (16) and has a tension arch (18) on its front end, the arches (16 and 18) each being guided laterally in the guideways (28), to provide convexity of the blind web (10) in the transverse direction, between at least one hook-out guide (30) is provided which runs essentially parallel to the guideways (28) at a distance and which is arranged such that the blind web (10) is curved in the transverse direction when the arches (16) engage the hook-out guide (30).

22 Claims, 5 Drawing Sheets

BLIND ARRANGEMENT FOR VEHICLES

BACKGROUND OF THE INVENTION

1. Field of the Invention

The invention relates to a blind arrangement with a blind web which can be unwound from a winding roller in order to at least partially cover an opening relative to the interior of a vehicle, especially a motor vehicle, and which can be wound back onto the winding roller in order to at least partially expose the opening, the blind web being provided in the transverse direction with arches and has a tension arch on its front end, the arches being guided laterally in guideways and provide convexity to the blind web in the transverse direction. Furthermore, this invention relates to a vehicle roof with such a blind arrangement.

2. Description of Related Art

Blind arrangements of the initially mentioned type are used, for example, in motor vehicles having a roof opening in a fixed roof surface which is closed and opened by means of a transparent cover. The blind arrangement is located underneath the roof opening in order to be able to regulate the light incidence through the roof opening. The use of these blind arrangements is, however, not limited to vehicle roofs. Rather, these blind arrangements can be used in the same way in windows or other compartments to be separated from the passenger compartment, for example, to separate a sleeping compartment or a high roof. To simplify the description of the blind arrangement to which the invention relates, reference will be made solely to the application thereof to vehicle roofs below.

In earlier blind arrangements, flat blind webs were used in which the blind web was tensioned by means of a stiff tension arch attached to its front edge above the roof opening. In order, on the one hand, to stiffen the blind web and so to reduce its sagging, and on the other hand, in a vehicle roof that is arched in the lengthwise direction of the vehicle, in order to not limit the head space underneath the blind arrangement by a blind web tensioned between the winding roller and the tension arch, the blind web is advantageously provided with arches which are guided laterally in guideways. Since vehicle roofs, however, are generally arched not only in the lengthwise direction of the vehicle, but also in its transverse direction, for optimum use of the space available in the passenger compartment, it is desirable to have a blind arrangement in which provisions are made for convexity of the blind web in the transverse direction of the vehicle.

International Patent Application Publication WO-A-96/01191 describes a blind arrangement of the initially mentioned type in which the distance of the guideways in which the arches are guided is selected such that, near the winding roller, it corresponds to the length of the arch, but then shortens in a transition area as the distance from the winding roller increases, so that the arches are curved transversely to the blind web upon passage through the transition area. The main defect of this approach is that inherently high frictional forces occur between the arches and the guideways. Another defect lies in the tolerance sensitivity of this structure which follows from the fact that, especially when using the blind arrangement in vehicle roofs, only a relatively slight convexity is to be produced in the transverse direction of the vehicle. However, the greater the radius of convexity to be spanned, the greater the ratio of the height of convexity to the constriction of the guideways and the narrower the tolerances to be maintained for a special desired transverse blind arch both in production and also installation of the profile components which have narrowing guideways.

Published Japanese Patent Application 63-258213 describes another attempt at an approach to the aforementioned problem. Here, the blind web is provided with arches in the transverse direction which are made of an elastic material and which, in the released state, have a convexity according to the desired transverse blind convexity. To be able to wind the blind web onto a winding roller to save space, there is a hold-down sheet in order to bend the arches when winding onto the winding roller. As a result of the high friction losses which inherently occur when bending the arches straight, in this construction approach for winding of the blind web onto the winding roller, a separate return motor is necessary; for several reasons, for example, the amount of space required, installation complexity, costs, etc. this is a disadvantage.

SUMMARY OF THE INVENTION

Based on the problems which occur in the known blind arrangements, one object of the present invention is to devise a blind arrangement of the initially mentioned type which can be produced and installed more easily and economically.

This object is achieved in a blind arrangement of the initially mentioned type by the fact that, between the guideways, there is a hook-out guide which runs at a distance from the surface running transversely through the guideways, and which is arranged such that the blind web is curved in the transverse direction when the arches engage the hook-out guide. In the embodiment of the blind arrangement in accordance with the invention, thus, the convexity of the arches and thus of the blind web is accomplished by the side edges of the blind web being fixed along the guideways as a result of the arches connected to the blind web, while by means of the hook-out guide located between the guideways at a distance from the surface which runs transversely through the guideways, a force is applied to a part of the blind web located between the guideways perpendicularly to the blind web. The approach in accordance with the invention is less sensitive to tolerances and produces less friction than the blind arrangements known from the prior art.

If on the edges of the blind web a different convexity in the lengthwise direction of the blind web is to be achieved than in the area of the blind web which lies between the guideways, this can be achieved by the hook-out guide being provided with a different convexity than the guideways.

To further reduce the friction losses in the curving of the blind web, the hook-out guide on its end facing the winding roller can have a ramp onto which the arches run when the blind web is wound up. The ramp then represents a bending area in which the respective arch which engages the ramp is gradually bent to the desired convexity, proceeding from the straight state of the arch on the winding roller.

While embodiments of the blind arrangement in accordance with the invention with only one hook-out guide are especially suitable for applications in which the opening to the interior of the vehicle is divided anyway, for example, in a vehicle roof which has two roof openings separated by a center strut which runs in the lengthwise direction of the vehicle, it can be advantageous when there are two hook-out guides adjacent to the guideways so that the opening to the interior of the vehicle which is covered or to be cleared by means of the blind web is not adversely affected by a hook-out guide which traverses the opening.

If the tension arch is not to be wound at the same time onto the winding roller, which will be the case in most applications of the blind arrangement in accordance with the invention, the friction which occurs in the movement of the blind web can be further reduced if the tension arch is curved beforehand such that, when the blind web moves, it does not engage the hook-out guide.

Furthermore, if the positions of the arches with reference to the blind web are selected such that the arches are in different peripheral positions when the blind web is rolled onto the winding roller, a diameter of the wound blind web which is as small as possible can be achieved. The diameter of the wound blind web can be further reduced when the arches are curved, especially when the radius of the provided convexity of the individual arches corresponds roughly to the distance of the arch from the axis of the winding roller in the wound state of the blind web.

Arches, especially those which have a straight shape in the lengthwise direction when the blind web is rolled onto the winding roller, but with which convexity of the blind web can be achieved when the blind web is unwound from the winding roller, can be produced in several different ways. According to one embodiment, the arches can be produced from a flexible elastic material. However, according to another embodiment, the arches can also have several connected sections. Furthermore, these sections can also be interconnected by means of a hinge. The hinges can be especially film hinges which, on the one hand, can be produced without high costs and which then facilitate the insertion of the arches into the pockets when, in another embodiment of the invention, the blind web has pockets in the transverse direction into which the arches are inserted.

According to one alternative embodiment, the blind web is provided, instead of with articulated arches, with arches which have several sections which are not connected to one another, and which are inserted into pockets which are located transversely relative to the length of the blind web and which have a cross section which is selected such that the facing ends of the individual sections of the arches rest abutting against one another when the blind is arched. To preclude slippage of the abutting ends, advantageously, the cross section of the pockets is chosen such that it corresponds roughly to the cross section of the arches.

To prevent fouling of the pockets, and upon longer use of the blind arrangement, damage to them, the pockets are arranged such that they do not adversely affect engagement of the arches with the hook-out guides. Especially here, the width of the blind web can be such that it covers the hook-out guides, the pockets at the contact points between the arches and the hook-out guides being interrupted such that they do not adversely affect engagement of the arches with the hook-out guides. Alternatively, the blind arrangement can also be designed such that the length of the pockets corresponds to the width of the blind web, and the width of the blind web is such that it does not cover the hook-out guides.

If the blind arrangement is to be moved by means of a drive, especially by means of an electric drive, a compressively stiff cable can be used which engages the tension arch in order to move the blind web.

Furthermore, to reduce friction between the arches and the guideways, the ends of the arches can be provided with guide shoes, it being especially advantageous if the guide shoes have a cylindrical cross section in the direction extending transversely relative to the arches since then, independently of the convexity of the arches, i.e., independently of the angle at which the arches project out of the guideway, provisions are made for uniform contact of the guide shoe against the guideways. Mainly, it is not necessary to twist the rail around the lengthwise axis.

As was already mentioned above, the blind arrangement described here can be advantageously provided in a vehicle roof.

The vehicle roof can have a guideway here through which a compressively stiff cable extends which engages the tension arch to move the blind web. In one advantageous embodiment of this vehicle roof, the guideway is furthermore used as a guideway for the arches. Here, the guideway preferably has a cylindrical cross section, the ends of the arches then being provided with guide shoes which likewise have an cylindrical cross section.

The installation cost for attaching the blind arrangement according to the invention can be reduced if the roof is made such that the guideways and hook-out guides are part of a one-piece profile component.

To facilitate threading of the arch ends or the guide shoes applied to the ends of the arches, the guideways can have an area which is widened towards the winding roller.

Preferred embodiments of the invention are explained below with reference to the accompanying drawings.

DETAILED DESCRIPTION OF THE INVENTION

Figure 1:
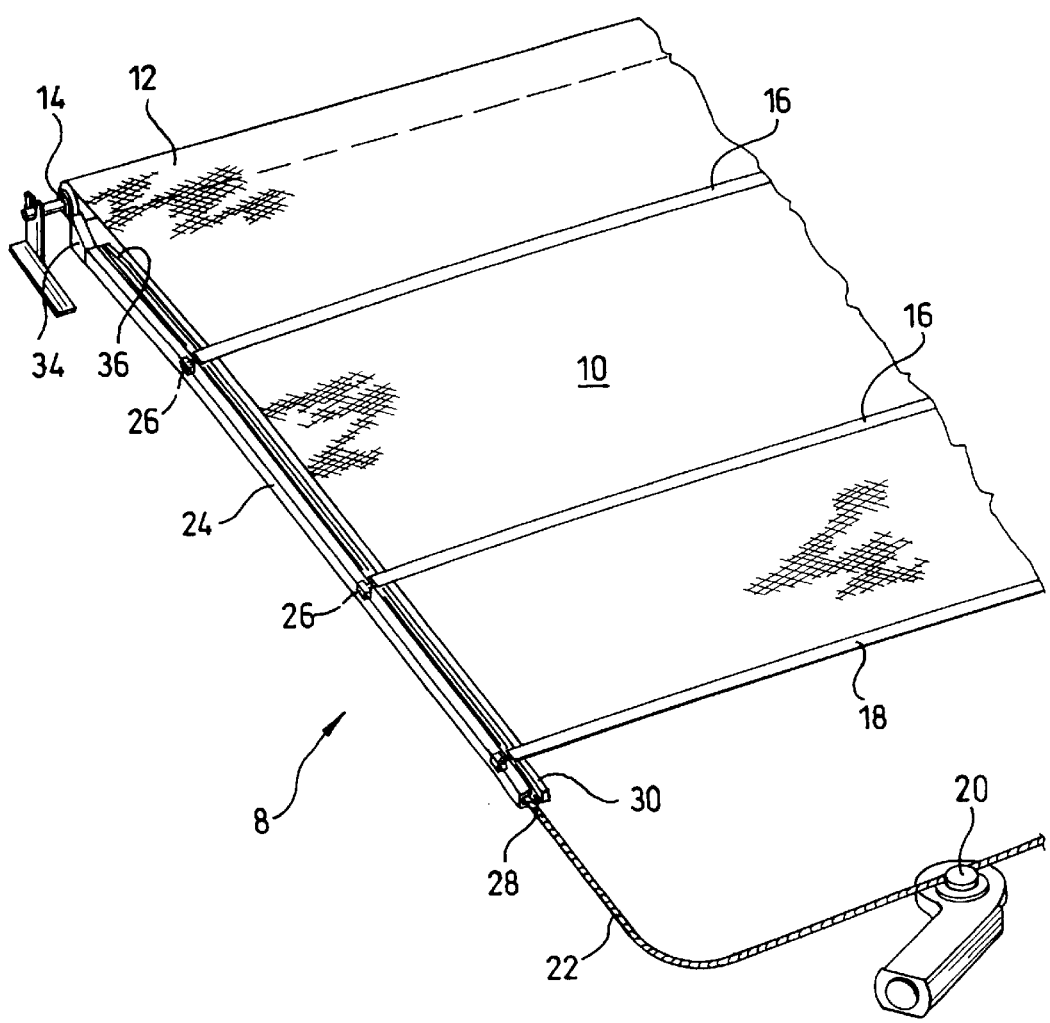
FIG. 1 is a schematic perspective view of a blind arrangement in accordance with the invention.

In the blind arrangement 8 which is shown schematically in FIG. 1, a blind web 10 is accommodated on a winding roller 12. The winding roller 12 is supported laterally in roller bearings and is pretensioned preferably by means of a spring arrangement 14, such that the blind web 10 is automatically wound onto the winding roller 12 when no other forces are acting on the blind web. The blind web 10 is provided in the transverse direction with several arches 16 and on its front end has a tension arch 18. The arches are preferably produced from a hard but elastic material, and are in the released state in order to not adversely affect winding of the blind web 10 which is provided with arches 16 onto the winding roller 12. The tension arch 18 is preferably made as a rigid component and is used to move the blind web either directly by hand, or as is shown in FIG. 1, by means of a drive mechanism 20 which preferably has a motor. Here, a compressively stiff (incompressible) cable 22 which is operated by the drive mechanism 20 engages the tension arch in order to move the blind web 10 in the wind-up or wind-off direction.

Figure 6:
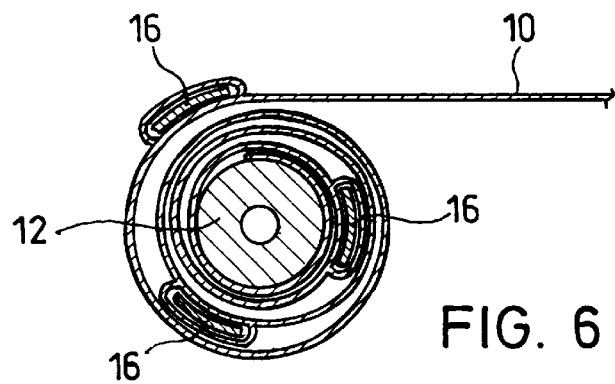
FIG. 6 is a section through a winding roller with the blind web wound up.

The tension arch 18 and the arches 16 are guided laterally in guideways 28 of a profile component 24, preferably, with guide shoes 26 of a cross section which corresponds roughly to the cross section of the guideways 28 being applied to the ends of the arches 16 and 18. If there is a compressively stiff cable 22 for moving the blind web, the guideway 28 can be used simultaneously as the guideway for the guide shoe 26 and also as the guideway for the cable 22. If the blind arrangement is used in a vehicle with a roof which is curved up both in the transverse and lengthwise direction of the vehicle, especially to be able to change the passage of light through a transparent cover which is curved according to the roof convexity, the guideways 28 can be curved in the lengthwise direction for purposes of matching the shape of the blind web to the shape of the roof or roof cover. The convexity of the blind web 10 is better adjusted to the convexity of the guideways 28, the more arches 15 are present. In the choice of the number of arches 16, however, it should be considered that the more arches 16 are provided, the more room for installing the winding roller 12 must be provided as an increase in the number or arches 16 will increase the diameter of the rolled web as should be recognizable from FIG. 6.

The diameter of the blind web 10 wound onto the winding roller 12 can be made smaller by selecting the positions of the arches 16 with respect to the blind web 10 such that the arches 16, when the blind web 10 is wound onto the winding roller 12, are in different peripheral positions (FIG. 6), and by on the other hand the arches being provided with a cross section which is curved according to the convexity of the winding roller. Depending on the width of the arches 16 and the diameter of the winding roller 12, as well as the diameter of the blind web 10 wound onto the winding roller 12 it can furthermore be feasible to provide the blind web 10 with different arches 16 which each have a radius of convexity which corresponds roughly to the distance of the respective arch from the axis of the winding roller, measured in the wound state of the blind web.

To match the convexity of the blind web 10 in the transverse direction, as is shown in FIG. 1, a hook-out guide 30 is used, a further hook-out guide being provided on the opposite edge of the blind web which is not shown in FIG. 1, but such a further hook-out guide is not essential. The hook-out guide 30 runs parallel to the guideway 28 in which the guide shoes 26 of the arches 16, 18 are guided. Preferably, the guideway 28 and the hook-out guide 30 are part of the same one-piece profile component 24. as is apparent from the enlarged view of FIG. 2.

The hook-out guides 30 are arranged such that they run between the guideways 28 at a distance from the guideways 28. If the blind web 10 as shown is to be arched upward, the hook-out guides 30 or the surfaces 32 thereof which engage the arches 16 run in the form of a rising ramp 36 into an upper guideway 37 which is higher than the level of the guideway 28 of the guide shoe 26 (FIGS. 8 and 9), so that when the arches 16 engage the hook-out guides 30 as the blind web 10 is wound off the winding roller 12, an upwardly directed force is exerted on the underside of the arches 16, by which the arches 16, whose ends are fixed in the vertical direction by means of the guide shoes 26 guided in the guideways 28 and which thus cannot deflect upward, are bowed in an upward direction. The convexity of the arches 16 and thus the blind web 10 is a function of the distance of the distance between the guideways 28 and the hook-out guides 30, and of the height of the hook-out guides 30 with reference to a transverse center line running through the guideways 28.

Figure 2:
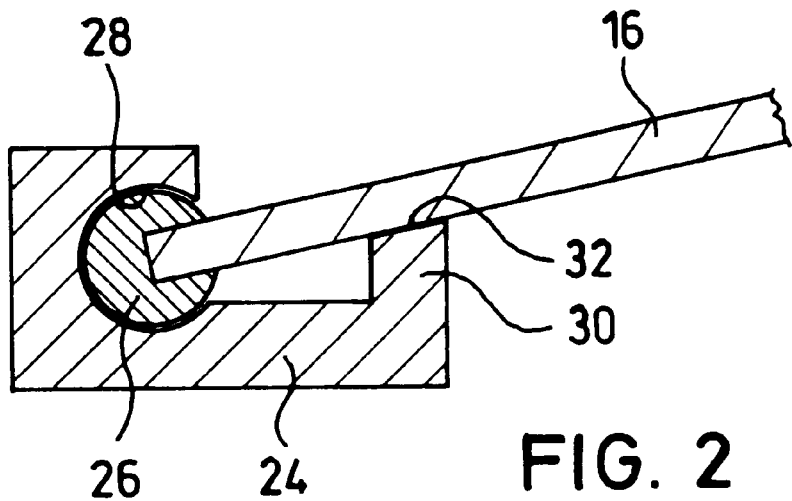
FIG. 2 shows a section through the end area of an arch of the blind arrangement being guided in a profile component, as shown in FIG. 1.

As is shown in FIG. 2, the surface 32 of the hook-out guide 30 which engages the arches 16 can be angled upward relative to in a transverse direction toward the center of the blind web 10 according to the desired convexity of the arches 16.

Figure 9:
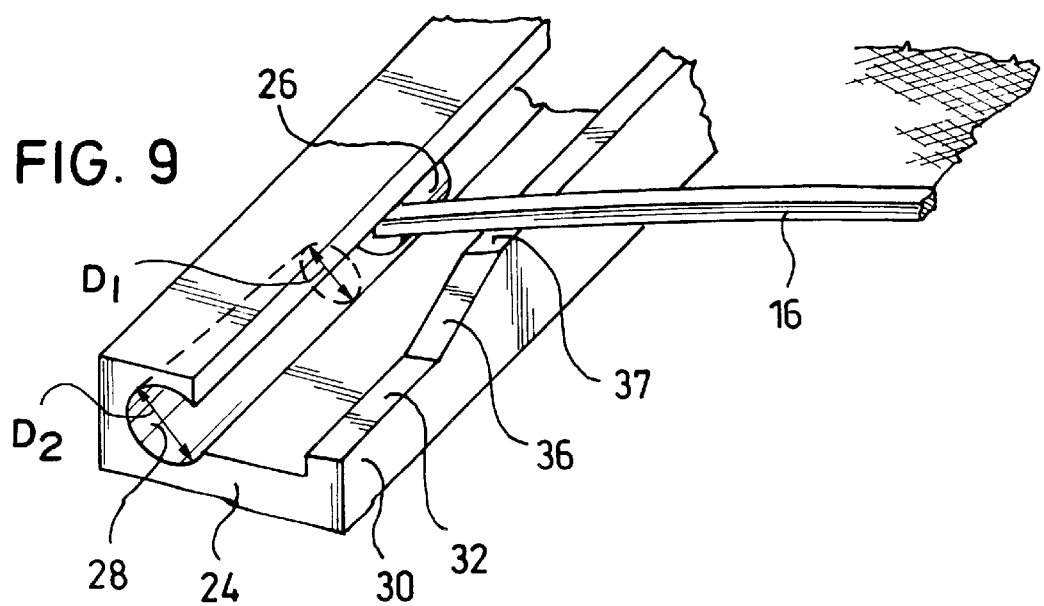
FIG. 9 shows a view according to FIG. 8 with the arch in its bent position after moving up the ramp.

To facilitate threading of the arches 16 or the guide shoes 26 into the guideways 28, as shown in FIG. 1 at 34, the ends of the guideways 28 facing the winding roller 12 can be widened, i.e., the entrance end of the guideway 28 has a diameter $D_2$ which is greater than the diameter $D_1$ of the remainder of the guideway as represented in FIG. 9. Furthermore, the hook-out guides 30 on their ends facing the winding roller 12 preferably have the above-noted ramp 36 onto which the arches 16 run when the blind web 10 is unwound from the winding roller 12.

Figure 8:
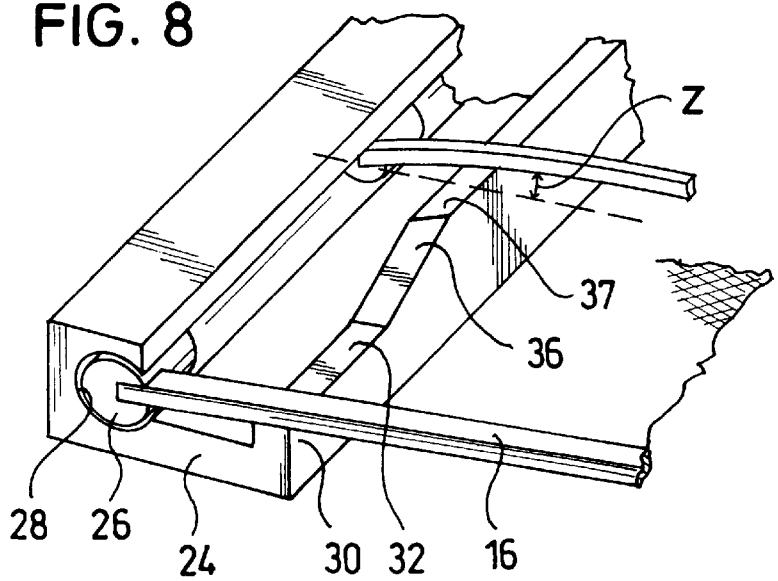
FIG. 8 is a perspective partial view of the blind guide in the area of a ramp prior to movement of the arch onto the ramp.

Since the tension arch 18 is generally not accommodated onto the winding roller 12, it can be made as a rigid component, and it should then be pre-curved such that it does not engage the hook-out guides 30, but moves beyond them without touching them, i.e., passes above them with a clearance z between the tension arch 18 and the upper guideway 37 (FIG. 8).

Figure 3:
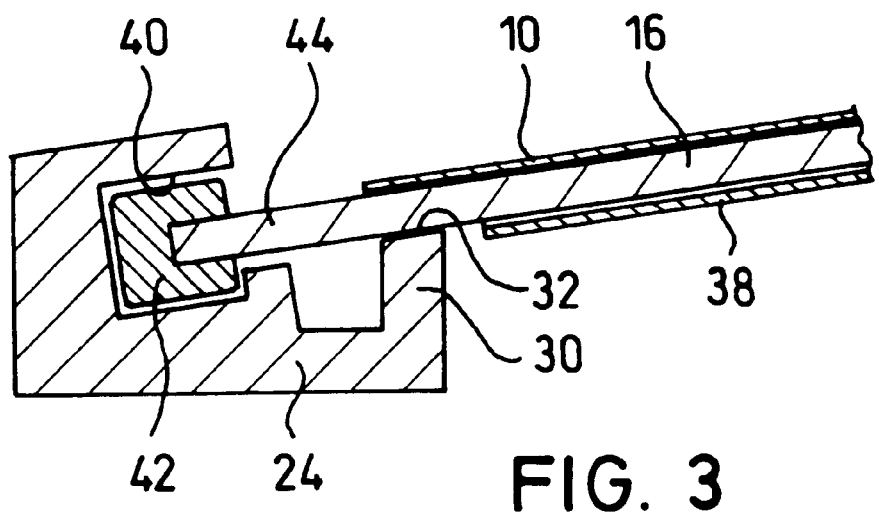
FIG. 3 shows a section through the end area of an arch guided in a profile component according to another embodiment of the blind arrangement as shown in FIG. 1.

The arches can be attached to the blind web 10 in any way. One type of attachment is indicated in FIG. 3, which shows a blind web 10 which on its bottom has a pocket 38 into which an arch 16 is inserted. It goes without saying that the pocket 38 could be located in the same way, preferably, on the top of the blind web 10, especially since it is not possible to view the top from the interior and the blind web in this version is smooth on the inside. The width of the blind web 10 is thus dimensioned such that it projects over the hook-out guide 30 so that no addition lateral facing between the profile component 24 and the blind web 10 is necessary. The length of the pocket 38 is selected such that it does not adversely affect engagement between the arch 16 and the engagement surface 32 of the hook-out guide 30.

Furthermore, FIG. 3 shows another embodiment of a profile component 24. The profile component 24 as shown in FIG. 3 has, similarly to the conventional guide rails, a guideway 40 with a rectangular cross section into which a correspondingly rectangular guide shoe 42 is guided. To enable curving of the arch 16, the guideway 40 must be tilted, relative to the cross section which is horizontal in FIG. 3, according to the angular position of the arch end area 44 located between the guideway 40 and the hook-out guide 30 of the profile component 24. If the hook-out guide 30 has a ramp 36 according to FIG. 1, this tilting necessitates twisting of the rectangular guideway 40.

Figure 4:
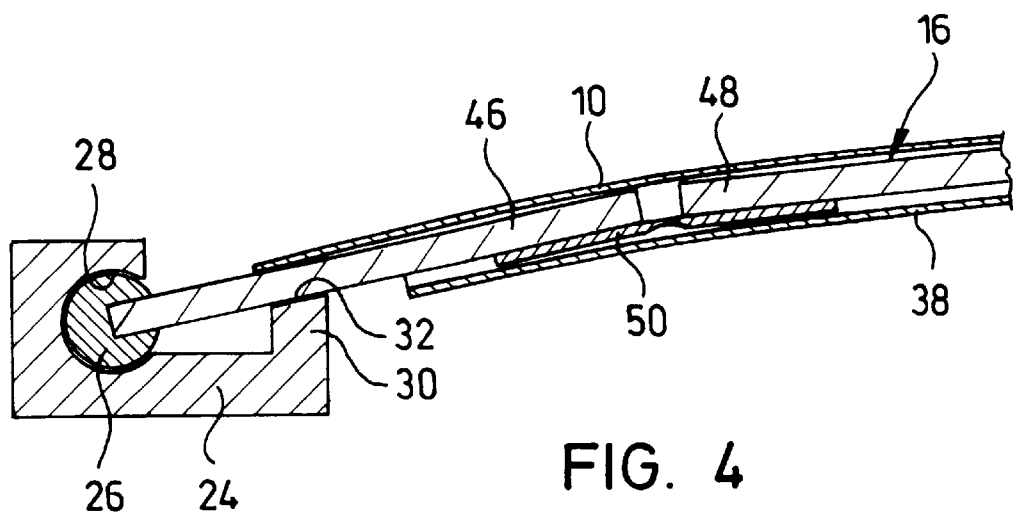
FIGS. 4 and 5 show views similar to FIG. 2, however, with provisions being made for the capacity of the arch to curve differently than in FIG. 2.

According to a further embodiment of the blind arrangement, as shown in FIG. 4, the arches 16 can be formed of rigid sections, two sections 46 and 48 of which are shown in FIG. 4, interconnected by hinges 50 that are, preferably, formed as film hinges. When the arches 16 are inserted into the pockets 38 of the blind web 10, the hinges 50 do not unduly adversely affect insertion of the arches into the pockets due to their thin, flat cross sections.

Figure 5:
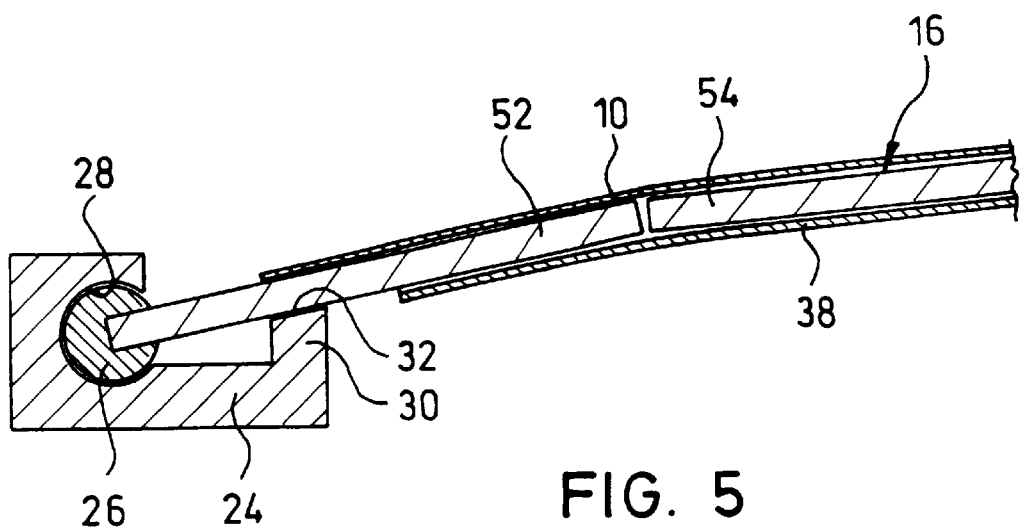

In the embodiment shown in FIG. 5, the arches 16 are formed of rigid sections, two of which 52 and 54 are shown in FIG. 5, which are not joined to one another, but are, instead, loosely inserted into the pocket 38. The cross section of the pocket 38 is dimensioned such that it is reliably insured that the ends of the arch sections 52 and 54 will abut and cannot slide past one another within the pocket.

Figure 7:
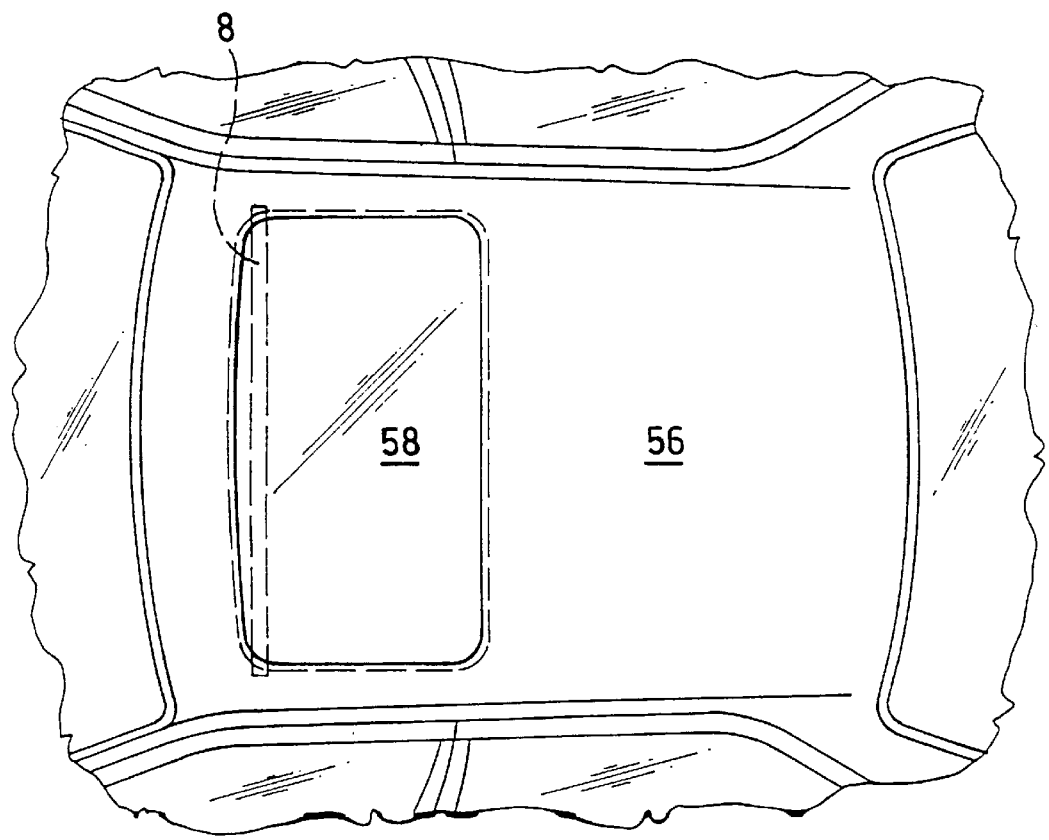
FIG. 7 shows a partial aspect of a vehicle roof in which the blind arrangement described here is used.

As already mentioned, and as is shown in FIG. 7, the blind arrangement 8 described here can be inserted advantageously into vehicles in order to at least partially cover or expose a transparent cover element which is provided in a fixed roof surface 56. The cover element 58 can be an opaque glass cover or a transparent cover of a sliding roof, sliding and lifting roof, spoiler roof, or the like. However, the blind arrangement described here is suited in the same way for closing and exposing any large-area openings in which, on the one hand, sagging of the blind web is to be prevented, and on the other hand, provisions are to be made for producing a curvature of the blind web in the transverse direction.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

I claim:

1. A blind arrangement comprising a winding roller, a blind web having means for mounting the blind web and winding roller below a vehicle roof for winding and unwinding said blind web on said winding roller in order to at least partially cover and expose an opening in said vehicle roof relative to an interior of a vehicle, the blind web being provided with transversely extending arches and having a tension arch on a front end of the blind web, the transversely extending arches being laterally guided at each end in a guideway and providing convexity to the blind web in a transverse direction; wherein at least one hook-out guide is provided which runs along a respective guideway at a distance therefrom and which is arranged to contact the transversely extending arches and to produce a transverse bowing thereof such that the blind web is curved in the transverse direction when the transversely extending arches make contact with the hook-out guide.

2. The blind arrangement as claimed in claim 1, wherein the hook-out guide runs essentially parallel to the respective guideway.

3. The blind arrangement as claimed in claim 1, wherein the hook-out guide has a ramp on an end facing thereof which faces the winding roller and onto which the transversely extending arches run when the blind web is wound off of the winding roller.

4. The blind arrangement as claimed in claim 1, wherein there are two hook-out guides adjacent to the respective guideway.

5. The blind arrangement as claimed in claim 1, wherein the tension arch is pre-curved to have a height enabling it to pass without contact over the hook-out guide when the blind web is moved.

6. The blind arrangement as claimed in claim 1, wherein the transversely extending arches are made of an elastically flexible material.

7. The blind arrangement as claimed in claim 1, wherein the transversely extending arches are comprised a plurality sections.

8. The blind arrangement according to claim 7, where a hinge connects each of the sections of the transversely extending arches to an adjoining one of the sections.

9. The blind arrangement as claimed in claim 8, wherein the hinges are film hinges.

10. The blind arrangement as claimed in claim 9, wherein the blind web has transversely extending pockets into which the transversely extending arches are inserted.

11. The blind arrangement as claimed in claim 7, wherein the blind web has transversely extending pockets into which the transversely extending arches are inserted.

12. The blind arrangement as claimed in claim 11, wherein the arche sections are not directly connected to one another; and where the pockets have a cross section which prevents facing ends of the individual sections of the transversely extending arches from passing one over the other so that they will abut against each other when the blind is arched.

13. The blind arrangement as claimed in claim 12, wherein the cross section of the pockets is approximately the same as the cross section of the transversely extending arches.

14. The blind arrangement as claimed in claim 11, wherein the pockets terminate transversely inward of the hook-out guides such that they do not adversely affect engagement of the transversely extending arches with the hook-out guides.

15. The blind arrangement as claimed in claim 11, wherein the width of the blind web is dimensioned greater than that between the hook-out guides such that the blind web covers the hook-out guides; wherein the pockets terminate transversely inward of the contact points between the transversely extending arches and the hook-out guides such that they do not adversely affect engagement of the transversely extending arches with the hook-out guides.

16. The blind arrangement as claimed in claim 1, wherein a compressively stiff cable engages the tension arch for moving the blind web.

17. The blind arrangement as claimed in claim 1, wherein the ends of the transversely extending arches are provided with guide shoes.

18. The blind arrangement as claimed in claim 17, wherein the guide shoes have a cylindrical transverse cross section.

19. A vehicle roof comprising a fixed roof surface having an opening therein, a cover element for closing and exposing said opening; a blind web, a winding roller mounted below said cover element in proximity to an end of said opening and connected to the blind web for winding and unwinding said blind web thereon in order to at least partially cover and expose said opening relative to an interior of a vehicle, the blind web being provided with transversely extending arches and having a tension arch on a front end of the blind web, the transversely extending arches being laterally guided at each end in a guideway running along edge areas of the fixed roof surface and providing convexity to the blind web in a transverse direction; wherein at least one hook-out guide is provided which runs along a respective guideway at a distance therefrom and which is arranged to contact the transversely extending arches and to produce a transverse bowing thereof such that the blind web is curved in the transverse direction when the transversely extending arches make contact with the hook-out guide.

20. The vehicle roof according to claim 19, wherein a compressively stiff cable engages the tension arch and runs in said guideway for moving the blind web.

21. The vehicle roof as claimed in claim 19, wherein the guideway and hook-out guide are part of a one-piece profile component at each side of the roof opening.

22. The vehicle roof as claimed in claims 19, wherein each guideway has an area which is widened in a direction toward the winding roller.

* * * * *